(12) United States Patent
Chen et al.

(10) Patent No.: US 8,459,694 B2
(45) Date of Patent: Jun. 11, 2013

(54) GAS GENERATING DEVICE

(75) Inventors: Jianlin Chen, Kiyosu (JP); Yoshitaka Kashitani, Kiyosu (JP); Takashi Uemura, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 142 days.

(21) Appl. No.: 13/036,296

(22) Filed: Feb. 28, 2011

(65) Prior Publication Data

US 2011/0233908 A1    Sep. 29, 2011

(30) Foreign Application Priority Data

Mar. 2, 2010  (JP) .................................. 2010-45601
Aug. 30, 2010 (JP) .................................. 2010-192680

(51) Int. Cl.
*B60R 21/26*   (2011.01)
(52) U.S. Cl.
USPC ................... 280/741; 102/202.5; 102/202.14
(58) Field of Classification Search
USPC ............ 102/530, 531, 202.5, 202.12, 202.14;
280/741, 736, 737
IPC .............................................. B60R 21/26,22/46
See application file for complete search history.

(56) References Cited

U.S. PATENT DOCUMENTS

| 6,164,208 | A  | * | 12/2000 | Hsu et al. ................... 102/202.5 |
| 6,820,556 | B1 |   | 11/2004 | Oda |
| 8,176,851 | B2 | * | 5/2012  | Kodama et al. ............... 102/530 |
| 2002/0189487 | A1 |   | 12/2002 | Kubo et al. |
| 2003/0183110 | A1 | * | 10/2003 | Brede et al. ............. 102/202.14 |
| 2004/0160046 | A1 | * | 8/2004 | Tanaka et al. ................. 280/741 |
| 2004/0232679 | A1 | * | 11/2004 | Kubo et al. ................... 280/741 |
| 2006/0208474 | A1 | * | 9/2006 | Kubo et al. ................... 280/806 |
| 2007/0096451 | A1 | * | 5/2007 | Stevens ......................... 280/806 |
| 2012/0024186 | A1 | * | 2/2012 | Mitsunabe et al. ........... 102/530 |
| 2012/0079959 | A1 | * | 4/2012 | Chen et al. .................... 102/530 |

FOREIGN PATENT DOCUMENTS

| JP | A-2001-088653 | 4/2001 |
| JP | A-2002-200966 | 7/2002 |
| JP | A-2003-161599 | 6/2003 |

* cited by examiner

*Primary Examiner* — Ruth Ilan
(74) *Attorney, Agent, or Firm* — Posz Law Group, PLC

(57) ABSTRACT

A gas generating device includes a housing and a squib. The housing includes a housing body which accommodates a gas generating agent, a holder which holds a squib, and a connector which connects the housing and the holder to each other. A housing body is connected to the holder so that an annular contact portion is pressed toward the holder. The holder includes a holder body and a resinous molding portion which is interposed between the holder body and the squib. The resinous molding portion includes a flange portion with which the annular contact portion comes into contact. The holder body includes a support portion capable of supporting the flange portion when the housing body and the holder are connected to each other by the connector.

12 Claims, 5 Drawing Sheets

Fig. 3
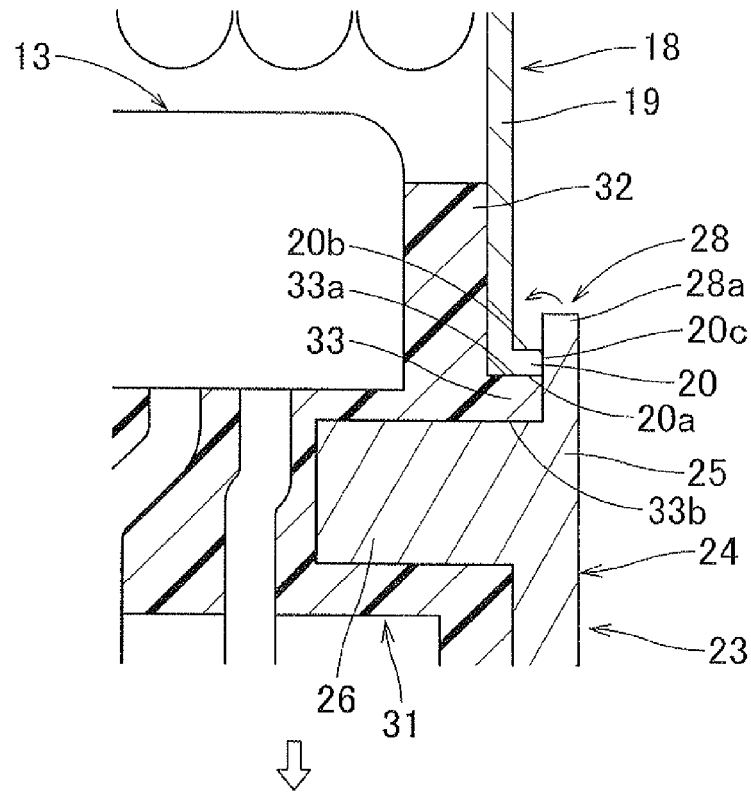
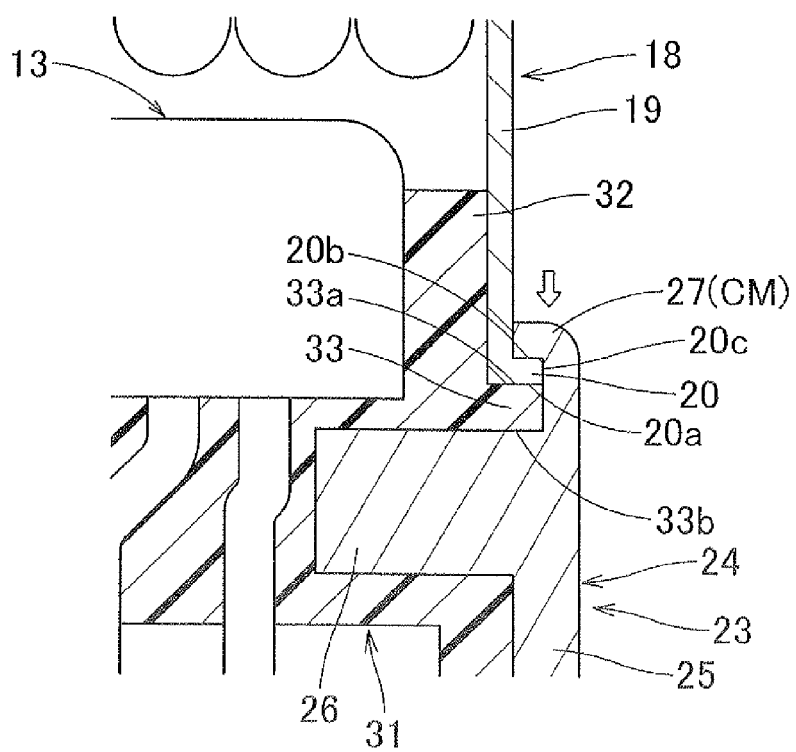

GAS GENERATING DEVICE

The present application claims priority from Japanese Patent Application No. 2010-45601 of Chen et. al., filed on Mar. 2, 2010 and Japanese Patent Application No. 2010-192680 of Chen et. al., filed on Aug. 30, 2010, the disclosures of which are hereby incorporated into the present application by reference.

BACKGROUND OF THE INVENTION

1. Field of the Invention

The present invention relates to a gas generating device that includes a housing filled with a gas generating agent generating a gas during combustion and a squib accommodated in the housing to ignite the gas generating agent.

2. Description of Related Art

Both now and in the past, among gas generating devices, there is known a gas generating device disclosed in JP-A-2001-88653, which has a combination in which a housing includes a holder holding a squib, a cup-shaped metallic bottomed housing body accommodating a gas generating agent, and a connector connecting the holder and the housing body to each other. In the gas generating device disclosed in JP-A-2001-88653, an annular contact portion is formed at the peripheral edge of an opening of the housing body so as to protrude in a flange shape. Then, in the gas generating device disclosed in JP-A-2001-88653, the housing body is connected to the holder by using a connector that is formed around the annular contact portion and presses the annular contact portion toward the holder in the axial direction of the housing body. More specifically, in the gas generating device, a caulking portion formed as the connector in the holder is pressed and caulked in the axial direction of the housing body so as to cover the entire periphery of the rear surface side of the outer peripheral surface of the annular contact portion, whereby the housing body and the holder are connected to each other.

However, in the gas generating device disclosed in JP-A-2001-88653, the holder is also formed of metal. For this reason, a so-called metal contact occurs in a wide surface between the annular contact portion and the portion of the holder coming into contact with the annular contact portion during a caulking operation of the caulking portion, so that air-tightness is difficult to be ensured.

Then, in order to solve the problem, there is known a gas generating device having a configuration disclosed in JP-A-2002-200966. In the gas generating device disclosed in JP-A-2002-200966, an O-ring is accommodated in a portion of a holder coming into contact with an annular contact portion so as to ensure air-tightness around the connection portion between a housing body and the holder. However, in the gas generating device disclosed in JP-A-2002-200966, a groove needs to be formed by cutting in the holder so as to accommodate the O-ring therein, and the O-ring is also needed. For this reason, it is necessary to make the configuration simpler, and to reduce the number of manufacturing steps and manufacturing cost.

Further, there is known another gas generating device in JP-A-2003-161599. In the gas generating device, a holder holding a squib includes a metallic holder body and a resinous molding portion interposed between the holder body and the squib and formed of a synthetic resin.

Of course, JP-A-2003-161599 discloses a configuration in which the holder holding the squib includes the resinous molding portion which covers the outer peripheral side of the squib on the side of an ignition portion and the holder body which is disposed at the outer peripheral side of the resinous molding portion and is disposed on the side of a conductive pin distant from the ignition portion in the squib. However, a housing body connected to the holder is not mentioned in JP-A-2003-161599. Further, a method of connecting the housing body is not mentioned. In the holder disclosed in JP-A-2003-161599, a groove is formed throughout the entire periphery of the peripheral surface of the resinous molding portion (refer to FIG. 1). It is supposed that the groove is used to insert an O-ring therein to improve air-tightness in the housing body. For this reason, even in the gas generating device disclosed in JP-A-2003-161599, it is supposed that the air-tightness in the housing is ensured by using the O-ring.

SUMMARY OF THE INVENTION

It is desirable to provide a gas generating device capable of satisfactorily maintaining air-tightness in a housing with a simple configuration and being manufactured at low cost.

The object of the invention is achieved by a following gas generating device.

A gas generating device includes: a housing which is filled with a gas generating agent generating a gas during combustion; and a squib which is accommodated in the housing to ignite the gas generating agent, wherein the housing includes a metallic housing body which forms an accommodation portion accommodating the gas generating agent, a holder which holds the squib, and a connector which connects the housing body and the holder to each other, wherein the housing body is formed in a substantially cylindrical shape and includes an annular contact portion coming into contact with an end surface on the side of the gas generating agent in the holder, the housing body being connected to the holder by the connector while the annular contact portion is pressed toward the holder in the axial direction of the housing body, wherein the holder includes a metallic holder body and a resinous molding portion which is interposed between the holder body and the squib and is formed of a synthetic resin, wherein the squib is integrally molded with the holder to be supported by the holder when the resinous molding portion is molded, wherein the resinous molding portion includes a flange portion which comes into contact with the entire periphery of a surface of the annular contact portion on the side of the holder, wherein the holder body includes a support portion capable of supporting the flange portion pressed while coming into contact with the annular contact portion when the housing body and the holder are connected to each other by the connector, and wherein the annular contact portion, the flange portion, and the support portion are disposed in parallel so as to overlap with each other in the axial direction of the housing body.

In the gas generating device of the invention, the housing body and the holder are connected to each other through the connector while the annular contact portion formed in the housing body is pressed toward the holder in the axial direction of the housing body. Then, in the gas generating device of the invention, the resinous molding portion formed in the holder and formed of a synthetic resin includes the flange portion with which the annular contact portion of the housing body comes into contact. For this reason, in the gas generating device of the invention, even when a pressing force that presses the annular contact portion toward the holder during a connection operation using the connector acts to press the flange portion inward, the flange portion is elastically deformed in a manner similar to the O-ring that is used both now and in the past compared to the metallic holder body or the annular contact portion. That is, even when the flange portion is pressed and deformed by the annular contact portion, the flange portion is restored so as to eliminate a gap between the flange portion and the annular contact portion while maintaining the connected state after the holder and the housing body are connected to each other. As a result, a gap between the flange portion and the annular contact portion may be prevented as much as possible. Further, in the gas generating device of the invention, the support portion formed in the metallic holder body is disposed in parallel to the annular contact portion and the flange portion so as to overlap with each other in the axial direction of the housing body. The support portion supports the flange portion pressed while coming into contact with the annular contact portion. For this reason, when the holder and the housing body are connected to each other by the connector, a pressing force that presses the annular contact portion may be prevented from pressing the flange portion inward more than the necessary pressing degree. As a result, the connection workability using the connector is also satisfactory. That is, in the gas generating device of the invention, the flange portion formed in the resinous molding portion of the holder serves as the O-ring, so that it is difficult for a gap to form between the resinous molding portion and the annular contact portion of the housing body, and it is difficult for a gap to form between the holder and the support portion. For this reason, it is difficult for a gap to form between the housing body and the holder, so that the air-tightness in the housing may be satisfactorily maintained.

Further, in the gas generating device of the invention, the resinous molding portion forming the flange portion is integrally molded with the squib together with the holder body. For this reason, the gas generating device may be manufactured at low cost with a simple configuration compared to the case where the O-ring is used as in the relate art. In the gas generating device of the invention, the holder body and the squib are integrally formed through the resinous molding portion when the resinous molding portion is molded. For this reason, satisfactory sealing performance is obtained between the squib and the holder body.

Accordingly, the gas generating device of the invention may satisfactorily maintain the air-tightness in the housing with a simple configuration and may be manufactured at low cost.

Specifically, when the housing body is formed in a cup shape with a bottom, the annular contact portion may be disposed at the peripheral edge of an opening so as to protrude in a flange shape, and the connector may be formed around the annular contact portion.

Further, in the gas generating device having the above-described configuration, a caulking portion serving as the connector may be formed in the holder body while being pressed and caulked in the axial direction of the housing body so as to cover the substantially entire periphery of the rear surface side of the outer peripheral edge of the annular contact portion. The caulking portion may extend from the support portion so as to overlap with the annular contact portion in the axial direction of the housing body, and may be disposed so as to cover the substantially entire periphery of the rear surface side of the outer peripheral edge of the annular contact portion.

In the gas generating device having the above-described configuration, the housing body may be strongly connected to the holder by the caulking portion. Further, when a caulking target portion is formed in the holder body so as to extend from the support portion, and the caulking target portion is pressed and caulked in the axial direction of the housing body so as to cover the substantially entire periphery of the rear surface side of the peripheral edge of the annular contact portion, the caulking portion is formed, so that the housing body is connected to the holder. For this reason, the gas generating device having the above-described configuration may be manufactured at low cost without the need of high precision in dimension.

The connector may include a male screw which is formed in the outer peripheral surface of the annular contact portion and a female screw which is formed in the housing body so as to be threaded into the male screw.

Further, when the gas generating device is used as an actuation device of an inflator, the housing body may be formed in a substantially cylindrical shape that extends from the outer peripheral wall of the inflator and covers the outer peripheral side of the holder, and the housing body may include a caulking portion which serves as the connector and is provided by pressing and caulking the leading end side of the housing body distant from the gas generating agent to the end surface of the holder body distant from the gas generating agent in the axial direction of the housing body.

Further, in the gas generating device having the above-described configuration, the thickness of the support portion in the axial direction of the housing body may be set to be larger than the thickness of the flange portion in the axial direction of the housing body. In the gas generating device having this configuration, the flange portion may be reliably supported by the support portion.

BRIEF DESCRIPTION OF THE DRAWINGS

FIG. 3 is a schematic enlarged cross-sectional view illustrating a caulking process of a caulking portion in the actuation device of FIG. 2.

DESCRIPTION OF THE PREFERRED EMBODIMENTS

Figure 1:
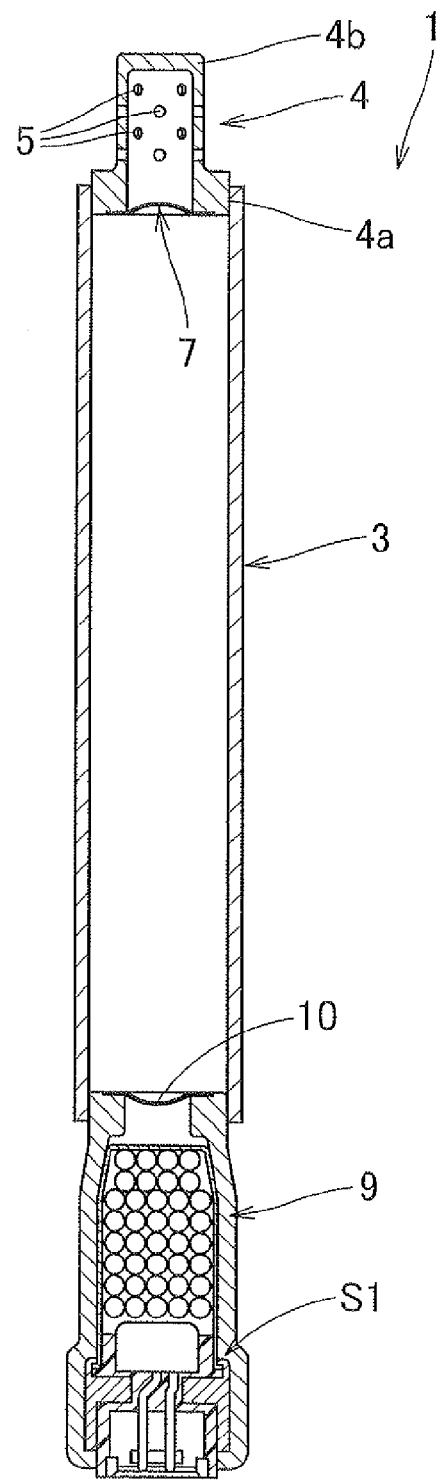
FIG. 1 is a schematic longitudinal sectional view illustrating an inflator having an actuation device using a gas generating device according to an embodiment of the invention.

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Hereinafter, an embodiment of the invention will be described by referring to the accompanying drawings. In the embodiment, a gas generating device will be exemplified which is used as an actuation device of a hybrid type inflator 1 configured to supply expansion gas to an airbag. Further, in the embodiment, unless there is a particular remark, the invention will be described on the assumption that the direction along the axial direction of a gas filling portion 3 to be described later in the inflator 1 (the axial direction of a cup 18 to be described later in an actuation device S1) is set as the vertical direction, the side of an opening metal portion 4 in the inflator 1 (the side of the cup 18 in the actuation device S1) is set as the upper side, and the side of a squib 13 of the actuation device S1 is set as the lower side.

As shown in FIG. 1, the inflator 1 of the embodiment is of a cylinder type that has a substantially cylindrical external shape. The inflator 1 has a configuration in which the opening metal portion 4 equipped with a gas discharge port 5 is disposed at one end (the upper end) of the substantially cylindrical gas filling portion 3 and the actuation device S1 serving as the gas generating device is disposed at the other end (the lower end).

The gas filling portion 3 is formed of steel pipe and is formed in a substantially cylindrical shape of which both ends in the axial direction are opened. Then, in the gas filling portion 3, both ends in the axial direction are respectively blocked by the opening metal portion 4 and a casing portion 9 accommodating the actuation device S1. The gas filling portion 3 is filled with nitrogen gas, helium gas, argon gas, or a mixture gas of these.

The opening metal portion 4 is formed of metal such as steel and is used to block one end (the upper end) of the gas filling portion 3 as shown in FIG. 1. The opening metal portion 4 is fixed to the gas filling portion 3 by welding a base portion 4a (the lower end). Plural gas discharge ports 5 are formed at a leading end 4b (the upper end) of the opening metal portion 4. In the embodiment, the diameter of the portion of the opening metal portion 4 on the side of the leading end 4b is smaller than that of the portion on the side of the base portion 4a. Further, plural gas discharge ports 5 are formed throughout the entire area of the substantially cylindrical outer peripheral surface in the circumferential direction at the side of the leading end 4b of the opening metal portion 4.

Further, a bursting disc 7 is disposed at the side of the base portion 4a of the opening metal portion 4 (refer to FIG. 1). The bursting disc 7 is used to block the gas discharge ports 5 by defining the opening metal portion 4 and the gas filling portion 3. The bursting disc 7 bursts when the actuation device S1 is actuated, so that the opening metal portion 4 communicates with the gas filling portion 3 and expansion gas is discharged from the gas discharge ports 5. Specifically, the bursting disc 7 bursts when combustion gas generated by burning a gas generating agent 15 filled in a cup 18 of the actuation device S1 flows into the gas filling portion 3, and the temperature of pressurization gas filled in the gas filling portion 3 increases, so that the internal pressure inside the gas filling portion 3 increases.

Figure 2:
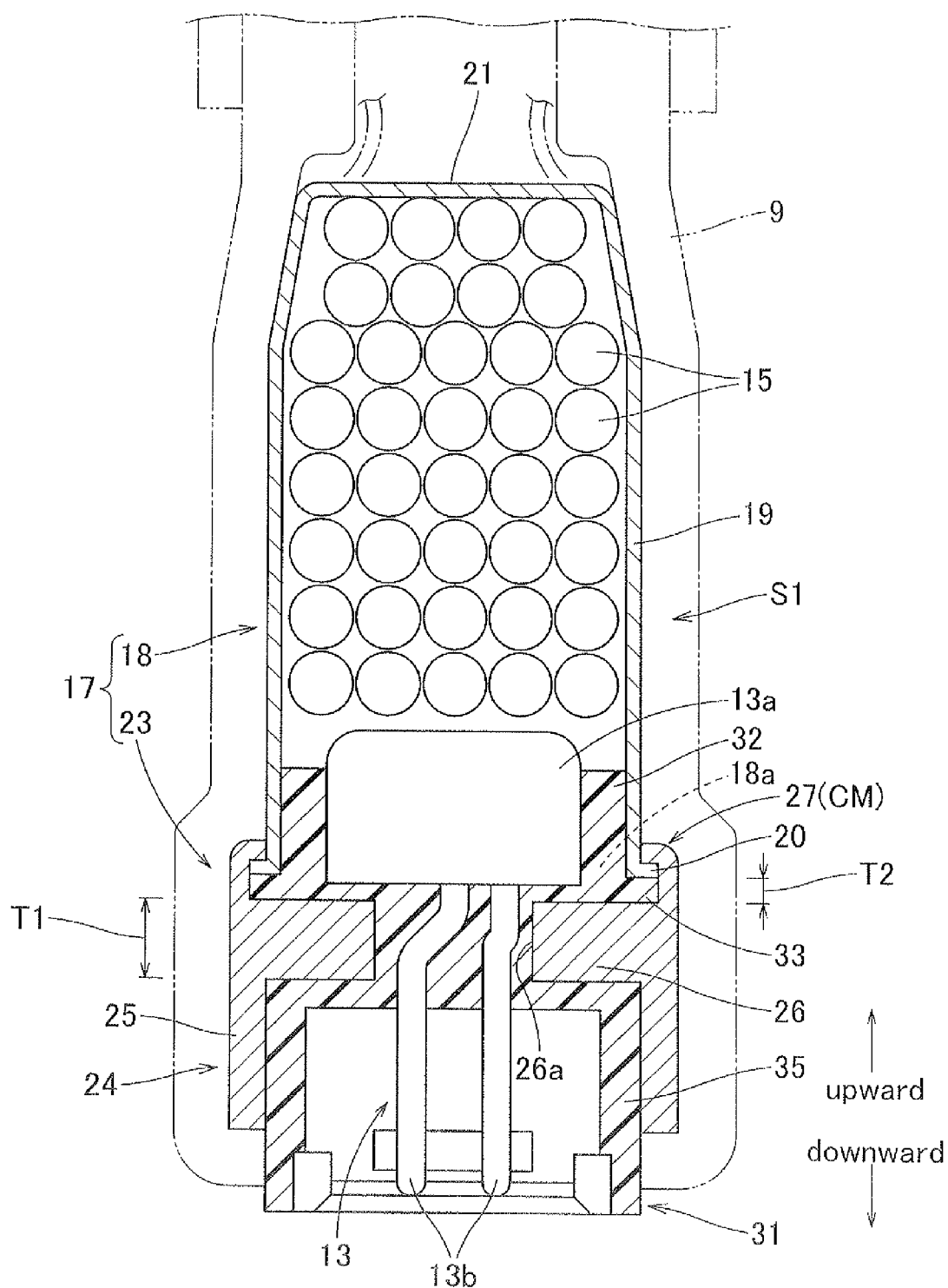
FIG. 2 is a partially enlarged cross-sectional view illustrating a portion of the actuation device in the inflator of FIG. 1.

As shown in FIGS. 1 and 2, the actuation device S1 serving as the gas generating device is accommodated in a casing portion 9 that blocks the other end (the lower end) of the gas filling portion 3. The casing portion 9 is formed of metal such as steel and is formed in a substantially cylindrical shape of which both ends are opened. Further, the casing portion 9 holds the actuation device S1 in a manner such that the lower end side portion is caulked to be press-inserted into a holder body 24 to be described later in the actuation device S1. A bursting disc 10 is disposed at the end on the side of the gas filling portion 3 (the upper end) in the casing portion 9 so as to define the actuation device S1 and the gas filling portion 3. The bursting disc 10 bursts when a squib 13 in the actuation device S1 is actuated. Specifically, when the squib 13 is actuated, first, a portion between the bursting target portions formed in the ceiling wall portion 21 in the cup 18 is opened, so that the casing portion 9 is filled with the combustion gas generated by burning the gas generating agent 15. Subsequently, when the internal pressure of the casing portion 9 increases due to the filled combustion gas, the bursting disc 10 bursts, so that the actuation device S1 and the gas filling portion 3 communicate with each other and the combustion gas generated by burning the gas generating agent 15 flows into the gas filling portion 3.

As shown in FIG. 2, the actuation device S1 serving as the gas generating device includes a housing 17 which is filled with the gas generating agent 15 generating combustion gas when the gas generating agent is burned and a squib 13 which is accommodated in the housing 17 and ignites the gas generating agent 15.

The squib 13 is accommodated in the housing 17 so as to be held by a holder 23 to be described later in the housing 17. The squib 13 includes an ignition portion 13a and a pair of conductive pins 13b extending from the ignition portion 13a. The ignition portion 13a is a portion that ignites the gas generating agent 15 filled in the cup 18 serving as a housing body. Then, the upper surface side of the squib 13 which is the side of the gas generating agent 15 in the ignition portion 13a is exposed while the squib 13 is held by the holder 23. Further, the squib 13 is held by the holder 23 so that the conductive pins 13b are exposed to the lower side which is the outside of the housing 17. Specifically, the periphery of the squib 13 is held by a resinous molding portion 31 to be described later in the holder 23. The squib 13 is integrally molded with the holder 23 when the squib 13 and the holder body 24 to be described later are molded by inserting when forming the resinous molding portion 31, so that the squib 13 is held by the holder 23. The ignition portion 13a is filled with priming powders (not shown). When a current is applied to the conductive pins 13b, the priming powders inside the ignition portion 13a are ignited and burned, so that a flame is generated from the ignition portion 13a. Then, the flame generated from the ignition portion 13a is used to burn the gas generating agent 15 filled in the cup 18 of the housing 17.

The housing 17 includes the cup 18 which is a metallic housing body forming an accommodation portion accommodating the gas generating agent 15, the holder 23 which holds the squib 13, and a connector CM which connects the cup 18 and the holder 23 to each other.

The gas generating agent 15 received in the cup 18 serving as the housing body is formed by molding predetermined chemicals, which may generate combustion gas when the chemicals are burned, in a predetermined shape. The gas generating agent 15 is filled inside the housing 17 (specifically, in the embodiment, a gap between the resinous molding portion 31 of the holder 23 and the cup 18 which is the upper side of the squib 13 in the housing 17) (refer to FIG. 2).

The cup 18 serving as the housing body is formed in a cylindrical cup shape with a bottom. In the embodiment, the cup 18 includes a substantially cylindrical peripheral wall portion 19 which extends from the holder 23 and a substantially disc-like ceiling wall portion 21. The ceiling wall portion 21 blocks the upper end side distant from the holder 23 in the peripheral wall portion 19. An annular contact portion 20 is formed at the peripheral edge of an opening 18a on the side of the holder 23 (the lower end side of the peripheral wall portion 19) in the cup 18. The annular contact portion 20 is formed in a substantially annular shape protruding outward in a flange shape from the peripheral edge of the opening 18a of the cup 18, and is formed throughout the entire periphery thereof. In the embodiment, the cup 18 is formed of metal such as aluminum alloy. While the cup 18 is filled with the gas generating agent 15, the cup 18 is connected to the holder 23 in a manner such that the annular contact portion 20 formed in the peripheral edge of the opening 18a comes into contact with the flange portion 33 to be described later in the resinous molding portion 31 in the holder 23, and a caulking portion 27 serving as the connector CM extending from the holder body 24 is caulked so as to cover the entire periphery of the rear surface (the upper surface 20b) of the outer peripheral edge of the annular contact portion 20. Further, in the embodiment, the inner diameter of the peripheral wall 19 of the cup 18 is set to be slightly larger than the outer diameter of an ignition portion holder 32, so that the ignition portion holder 32 to be described later of the resinous molding portion 31 may be inserted through the cup. The ceiling wall portion 21 in the cup 18 is provided with a thin bursting target portion (not shown) that may burst when the squib 13 is actuated. The bursting target portion is formed in a linear shape that radially extends from the center of the ceiling wall portion 21. Then, the ceiling wall portion 21 bursts the bursting target portion when the squib 13 is actuated, so that the portion between the bursting target portions is radially opened from the vicinity of the boundary to the peripheral wall 19 (refer to the two-dotted chain line of FIG. 2). Then, when the portion between the bursting target portions in the ceiling wall portion 21 is opened, combustion gas generated by burning the gas generating agent 15 is discharged into the casing portion 9 which is the outside of the cup 18.

The holder 23 includes the holder body 24 which is formed of metal, and the resinous molding portion 31 which is interposed between the holder body 24 and the squib 13 and is formed of a synthetic resin.

In the embodiment, the holder body 24 is formed of metal such as aluminum alloy or stainless steel (SUS). The holder body 24 includes a substantially cylindrical outer cylinder portion 25 which forms the outer peripheral side area of the holder 23, and a substantially disc-like support portion 26 which is formed at a position as the vicinity of the upper end (the end on the side of the cup 18) of an outer cylinder portion 25. The outer cylinder portion 25 covers the outer peripheral side of the cover portion 35 to be described later in the resinous molding portion 31 at the lower area of the support portion 26. The support portion 26 is disposed below the flange portion 33 so as to support the flange portion 33 formed in the resinous molding portion 31. The support portion 26 is formed in a plate shape, and the thickness T1 of the support portion 26 in the axial direction (aligned with the vertical direction) of the cup 18 is set to be larger than the thickness T2 of the flange portion 33 in the vertical direction (refer to FIG. 2). An insertion hole 26a is formed at the center of the support portion 26 so as to be opened in a round shape. The insertion hole 26a is used to insert therethrough the conductive pins 13b of the squib 13 and the cover portion 35 of the resinous molding portion 31 covering the periphery of the conductive pins 13b. Further, the caulking portion 27 serving as the connector CM is formed at the end side (the upper end side) of the holder body 24 closer to the cup 18 so as to connect the cup 18 and the holder 23 to each other. The caulking portion 27 is caulked so as to cover the entire area of the outer peripheral edge of the annular contact portion 20 provided in the cup 18.

The caulking portion 27 serving as the connector CM is formed to extend from the support portion 26. As shown in FIG. 3, in the embodiment, the caulking portion 27 is formed as a substantially cylindrical caulking target portion 28 before caulking, where the caulking target portion is formed to extend to the upper side from the entire periphery of the outer peripheral edge of the upper end of the outer cylinder portion 25 in the direction aligned with the outer peripheral surface. Then, at the time of the caulking, first, the cup 18 is placed on the holder 23 by allowing the annular contact portion 20 to come into contact with the flange portion 33 of the resinous molding portion 31. In this state, a portion 28a located at the leading end side (the upper end side) of the caulking target portion 28 and protruding to the upper side farther than the annular contact portion 20 is pulled down toward the center axis of the cup 18. Then, when the leading end side portion 28a is pressed and caulked to the lower side (toward the holder 23) so as to follow the axial direction (the vertical direction) of the cup 18, the caulking portion 27 may be formed. The thickness of the caulking target portion 28 is set to be smaller than that of the outer cylinder portion 25 (in the embodiment, about ⅓ of the thickness of the outer cylinder portion 25). Further, the protrusion distance (the length) of the caulking target portion 28 from the outer cylinder portion 25 is set to a dimension in which an area from the outer peripheral surface 20c of the annular contact portion 20 to the upper surface 20b (the rear surface) thereof may be covered by the caulking portion 27 when the caulking portion 27 is formed. The inner diameter of the caulking target portion 28 is substantially equal to the outer diameter of the annular contact portion 20. That is, the caulking target portion 28 is formed to cover the outer peripheral side of the annular contact portion 20 without a gap when the annular contact portion 20 is inserted through the caulking target portion 28. Then, the caulking portion 27 extends from the support portion 26 so as to cover the outer peripheral side of the flange portion 33 in the resinous molding portion 31 and to cover the outer peripheral side of the annular contact portion 20 throughout the entire area from the outer peripheral surface to the upper surface 20b (the rear surface). That is, the caulking portion 27 is disposed so as to overlap with the annular contact portion 20 in the axial direction (the vertical direction) of the cup 18.

The resinous molding portion 31 is interposed between the holder body 24 and the squib 13. In the embodiment, the resinous molding portion 31 includes the ignition portion holder 32 which holds the ignition portion 13a in the squib 13, and the cover portion 35 which covers the periphery of the conductive pins 13b below the ignition portion holder 32. The cover portion 35 is opened from the lower end side thereof so as to expose the lower end side of the conductive pins 13b. The ignition portion holder 32 is interposed between the ignition portion 13a and the peripheral wall portion 19 of the cup 18 at the outer peripheral side of the ignition portion 13a. Further, the ignition portion holder 32 covers the side surface of the ignition portion 13a so as to expose the upper surface side of the ignition portion 13a to the cup 18. The flange portion 33 is formed at the lower end side (the side of the holder body 24) of the ignition portion holder 32 so as to allow the annular contact portion 20 of the cup 18 to come into contact with the flange portion. The flange portion 33 is formed so as to protrude outward throughout the entire periphery of the cup 18 in the circumferential direction. The outer diameter of the flange portion 33 is substantially equal to the outer diameter of the annular contact portion 20. Then, an upper surface 33a of the flange portion 33 comes into contact with the leading end surface (the lower surface 20a, which is the side of the holder 23) in the annular contact portion 20 throughout the entire periphery (the entire surface). Further, a lower surface 33b of the flange portion 33 is supported by the support portion 26 of the holder body 24 throughout the entire periphery (the entire surface). That is, in the embodiment, the annular contact portion 20, the flange portion 33, and the support portion 26 are disposed in parallel so as to overlap with each other in the axial direction (the vertical direction) of the cup 18. The cover portion 35 is formed in a substantially cylindrical shape of which the lower end side is opened. Then, the cover portion 35 covers the outer peripheral side in the vicinity of the upper end of the conductive pins 13b at the lower side of the ignition portion holder 32 and covers the outer peripheral side of the lower end side of the conductive pins 13b while the conductive pins 13b are exposed. Further, the outer peripheral side of the cover portion 35 is covered by the outer cylinder portion 25 of the holder body 24. Then, the holder 23 of the embodiment is integrally formed with the holder body 24, the resinous molding portion 31, and the squib 13 by molding the holder body 24 and the squib 13 through inserting when the resinous molding portion 31 is formed.

In the embodiment, the resinous molding portion 31 is formed of a synthetic resin formed by containing glass fiber in polyamide resin such as 6,6-nylon or 6-nylon. The synthetic resin forming the resinous molding portion 31 is not limited to polyamide resin, but may be arbitrarily formed of any material as long as the longitudinal elastic modulus (Young's modulus) is set to be low. That is, as the synthetic resin forming the resinous molding portion 31, a synthetic resin may be used which has a longitudinal elastic modulus (Young's modulus) that allows elastic deformation in accordance with a pressing force applied to the lower side in the axial direction (the vertical direction) of the cup 18 when the caulking portion 27 is caulked and allows restoration while the caulked state of the caulking portion 27 is maintained after the caulking operation. Specifically, it is desirable that the synthetic resin forming the resinous molding portion 31 has a longitudinal elastic modulus (Young's modulus) is 20 GPa or less (desirably, the range from 5 to 15 GPa). Further, in the embodiment, since the resinous molding portion 31 is exposed to a flame when the gas generating agent 15 is burned, it is desirable that the resinous molding portion 31 has a flame resistance. Further, in the embodiment, since the resinous molding portion 31 is integrally molded with the squib 13 and the holder body 24 by insert-molding, the resinous molding portion 31 needs to be formed of a thermoplastic resin. Then, in view of such circumstances, in the embodiment, the resinous molding portion 31 is formed of a polyamide resin having glass fiber. Specifically, in the embodiment, the resinous molding portion 31 is formed of 6,6-nylon having 30 wt % of glass fiber.

The actuation device S1 of the embodiment may be manufactured as below. First, the holder 23 is integrally formed by molding the holder body 24 and the squib 13 through inserting when the resinous molding portion 31 is molded. Subsequently, the holder 23 is covered by the cup 18 so that the annular contact portion 20 of the cup 18 filled with the gas generating agent 15 comes into contact with the flange portion 33 of the holder 23. Then, the portion 28a at the side of the leading end (the upper end) of the caulking target portion 28 protruding to the upper side farther than the annular contact portion 20 is pressed and caulked to the lower side (toward the holder 23) in the axial direction of the cup 18, so that the caulking portion 27 serving as the connector CM is formed. In this manner, when the holder 23 and the cup 18 are connected to each other, the actuation device S1 may be manufactured. Then, the actuation device S1 is accommodated in the casing portion 9 that extends from the gas filling portion 3 filled with pressurization gas in advance. Subsequently, when the leading end (the lower end) of the casing portion 9 is caulked to be pressed toward the holder body 24, the actuation device S1 may be attached to the inflator 1.

Then, when an actuation signal is input to the squib 13 of the actuation device S1 through a lead wire (not shown) while the inflator 1 having the actuation device S1 is mounted as an airbag device on a vehicle, the ignition portion 13a of the squib 13 is ignited. Then, the gas generating agent 15 filled in the cup 18 is burned, so that combustion gas is generated. Further, the actuation device S1 of the embodiment bursts the bursting target portion formed in the ceiling wall portion 21 of the cup 18 when the squib 13 is actuated, so that the portion formed between the bursting target portions in the ceiling wall portion 21 is opened. Then, the combustion gas generated by burning the gas generating agent 15 is filled in the casing portion 9, so that the internal pressure of the casing portion 9 increases and the bursting disc 10 defining the gas filling portion 3 and the casing portion 9 bursts. Then, the combustion gas generated by burning the gas generating agent 15 flows into the gas filling portion 3, so that the temperature of the pressurization gas filled in the gas filling portion 3 increases. Then, the combustion gas flowing into the gas filling portion 3 increases the internal pressure of the gas filling portion 3, so that the bursting disc 7 blocking the side of the opening metal portion 4 in the gas filling portion 3 bursts. Subsequently, the combustion gas and the pressurization gas filled in the gas filling portion 3 are discharged as expansion gas from the gas discharge ports 5 of the opening metal portion 4 into the airbag.

Then, in the actuation device S1 (the gas generating device) used in the inflator 1 of the embodiment, the cup 18 and the holder 23 are connected to each other by the connector CM so that the annular contact portion 20 formed in the cup 18 serving as the housing body is pressed toward the holder 23 in the axial direction (the vertical direction) of the cup 18. Then, in the actuation device S1 of the embodiment, the resinous molding portion 31 formed in the holder 23 by a synthetic resin has the flange portion 33 with which the annular contact portion 20 of the cup 18 comes into contact. For this reason, in the actuation device S1 of the embodiment, even when a pressing force that presses the annular contact portion 20 toward the holder 23 acts to press the flange portion 33 inward during a connection operation (the caulking operation) using the connector CM (the caulking portion 27), the flange portion 33 is elastically deformed in a manner similar to the O-ring that is used both now and in the past compared to the metallic holder body 24 or the annular contact portion 20. That is, even when the flange portion 33 is pressed and deformed by the annular contact portion 20, the flange portion 33 is restored so as to eliminate a gap between the flange portion 33 and the annular contact portion 20 while maintaining the connected state (the caulked state using the caulking portion 27) after the holder 23 and the cup 18 are connected to each other by the connector CM. For this reason, a gap between the flange portion 33 and the annular contact portion 20 may be prevented as much as possible.

Further, in the actuation device S1 of the embodiment, the support portion 26 formed in the metallic holder body 24 is disposed in parallel to the annular contact portion 20 and the flange portion 33 so as to overlap with each other in the axial direction of the cup 18. The support portion 26 supports the flange portion 33 pressed while coming into contact with the annular contact portion 20. For this reason, when the holder 23 and the cup 18 are connected to each other by the connector CM, a pressing force that presses the annular contact portion 20 may be prevented from pressing the flange portion 33 inward more than the necessary pressing degree. As a result, in the actuation device S1 of the embodiment, the connection workability of the connector CM (the caulking workability using the caulking portion 27) is also satisfactory. That is, in the actuation device S1 of the embodiment, the flange portion 33 formed in the resinous molding portion 31 of the holder 23 serves as the O-ring, so that it is difficult for a gap to form between the flange portion 33 and the annular contact portion 20 of the cup 18. Then, it is difficult for a gap to form between the flange portion 33 and the support portion 26 of the holder 23. For this reason, in the actuation device S1 of the embodiment, it is difficult for a gap to form between the cup 18 and the holder 23, so that the air-tightness of the housing 17 may be satisfactorily maintained. As a result, it is difficult for humidity to enter the cup 18, so that the satisfactory combustion state of the gas generating agent 15 may be ensured for a long period of time when the squib 13 is actuated.

Further, in the actuation device S1 of the embodiment, the resinous molding portion 31 forming the flange portion 33 is integrally molded with the squib 13 together with the holder body 24. For this reason, the actuation device may be manufactured at low cost with a simple configuration compared to the case where the O-ring is used as in the related art. Further, in the actuation device S1 of the embodiment, the holder body 24 and the squib 13 are integrally formed with each other through the resinous molding portion 31 when the resinous molding portion 31 is molded. For this reason, satisfactory sealing performance is obtained between the squib 13 and the holder body 24.

Accordingly, in the actuation device S1 of the inflator 1 of the embodiment, the air-tightness of the housing 17 may be satisfactorily maintained with a simple configuration, and the actuation device may be manufactured at low cost.

Further, in the actuation device S1 of the embodiment, as the connector CM connecting the holder 23 and the cup 18 (the housing body) to each other, the caulking portion 27 extending from the support portion 26 in the holder 23 (the holder body 24) is used. The caulking portion 27 extends from the support portion 26 and is pressed and caulked in the axial direction (the vertical direction) of the cup 18 so as to cover the substantially entire periphery of the rear surface (the upper surface 20b) at the outer peripheral side of the annular contact portion 20. For this reason, in the actuation device S1 of the embodiment, when the caulking target portion 28 is formed in the holder body 24 so as to extend from the support portion 26, and the caulking target portion 28 is pressed and caulked in the axial direction (the vertical direction) of the cup 18 so as to cover the substantially entire periphery of the rear surface (the upper surface 20b) at the outer peripheral side of the annular contact portion 20, the caulking portion 27 may be formed, so that the cup 18 may be connected to the holder 23. As a result, the actuation device S1 of the embodiment may be manufactured at low cost without the need of high precision in dimension. Further, if this point is not taken into consideration, the actuation device may be manufactured as in the actuation device S2 shown in FIG. 4. In the actuation device S2, as the connector CM, a male screw 20e is provided at the outer peripheral side of an annular contact portion 20A in a cup 18A serving as a housing body, and a female screw 37b is provided at the inner peripheral side of a connection wall portion 37 to be described later in a holder body 24A, so that the cup 18A and a holder 23A are connected to each other by a screw.

Figure 4:
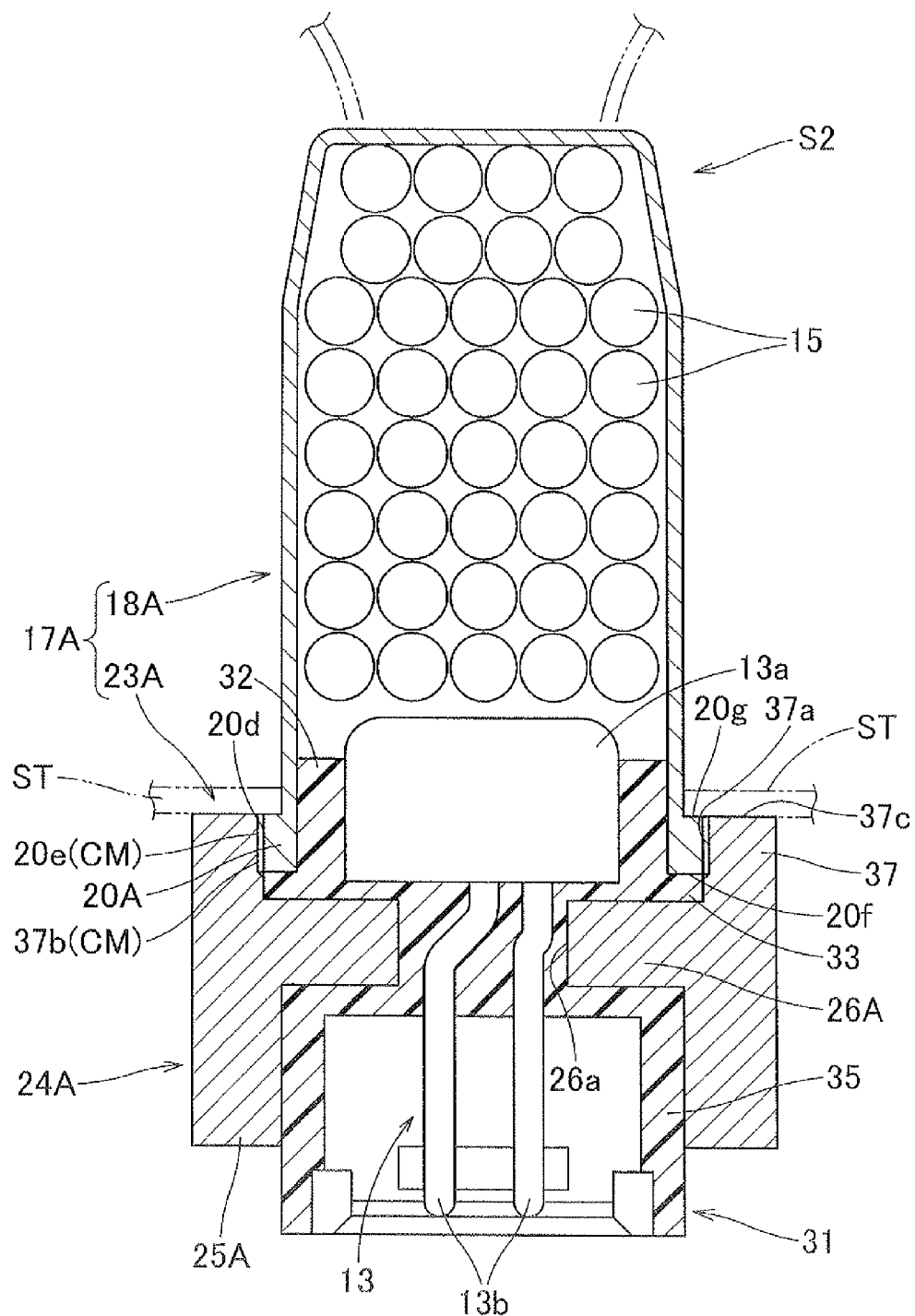
FIG. 4 is a schematic longitudinal sectional view illustrating an actuation device according to another embodiment of the invention.

As shown in FIG. 4, the actuation device S2 has the same configuration as that of the actuation device S1 except for a housing 17A. For this reason, in the actuation device 52, the detailed description thereof will not be repeated by giving the same reference numeral to the same component as that of the actuation device S1. As in the above-described actuation device S1, the housing 17A includes the cup 18A serving as the metallic housing body forming the accommodation portion accommodating the gas generating agent 15, the holder 23A holding the squib 13, and the connector CM connecting the cup 18A and the holder 23A to each other. The thickness of the annular contact portion 20A of the cup 18A is four times larger than the thickness of a peripheral wall portion 19A, and the male screw 20e forming the connector CM is disposed throughout the entire periphery of the outer peripheral surface 20d of the annular contact portion 20A. Since the cup 18A has the same configuration as that of the cup 18 of the above-described actuation device S1 except for the annular contact portion 20A, the detailed description thereof will not be repeated by giving "A" at the end of the reference numeral of the same component. In the actuation device S2, a concave portion is disposed in an area around the upper end of the peripheral wall portion 19A in the cup 18A so as to be partially depressed toward the central axis. The concave portion is used to prevent the cup 18A from rotating in the circumferential direction when the cup 18A and the holder 23A are connected to each other. Further, the annular contact portion 20A is formed so that the lower surface 20f comes into contact with the upper surface 33a of the flange portion 33 of the resinous molding portion 31 throughout the entire periphery (the entire surface) when the male screw 20e is fastened to the female screw 37b formed in the connection wall portion 37 of the holder body 24A.

The holder 23A includes the metallic holder body 24A, and the resinous molding portion 31 which is interposed between the holder body 24A and the squib 13 and is formed of a synthetic resin. Since the resinous molding portion 31 has the same configuration as that of the resinous molding portion 31 in the above-described actuation device S1, the detailed description thereof will not be repeated by giving to the same reference numeral to the same component. In the holder body 24A, the outer cylinder portion 25A is thicker compared to the holder body 24 in the thickness the above-described actuation device S1. Further, the holder body 24A is provided with the connection wall portion 37 that extends to the upper side from the support portion 26A instead of the caulking portion (the caulking target portion). Since the holder body 24A has the same configuration as that of the holder body 24 of the above-described actuation device S1 except for the external shape of the outer cylinder portion 25A and the connection wall portion 37, the detailed description thereof will not be repeated by giving "A" at the end of the reference numeral of the same component.

The connection wall portion 37 is formed to extend to the upper side from the entire periphery of the outer peripheral edge of the upper end of the outer cylinder portion 25A in the direction aligned with the outer peripheral surface. The inner peripheral surface 37a of the connection wall portion 37 is provided with the female screw 37b which serves as the connector CM into which the male screw 20e provided in the annular contact portion 20A may be threaded. The thickness of the connection wall portion 37 is slightly smaller than that of the outer cylinder portion 25A. Further, the connection wall portion 37 is formed so that an upper surface 37c is located at the same level with an upper surface 20g of the annular contact portion 20A while the male screw 20e is completely fastened to the female screw 37b. When the male screw 20e is completely fastened to the female screw 37b, the flange portion 33 of the resinous molding portion 31 is pressed to the lower side by the lower surface 20f of the annular contact portion 20A.

The actuation device S2 may be manufactured as below. First, the cup 18A filled with the gas generating agent 15 is set on a jig (not shown). Then, in the holder 23A integrally formed with the resinous molding portion 31 and the squib 13, the holder 23A is moved toward the cup 18A while the annular contact portion 20A is inserted into the gap between the ignition portion holder 32 and the connection wall portion 37. At the same time, the male screw 20e is fastened to the female screw 37b, and the holder 23A and the cup 18A are connected to each other so that the annular contact portion 20A is relatively pressed toward the holder 23A in the axial direction (the vertical direction) of the cup 18A. Then, when the holder 23A and the cup 18A are connected to each other, the actuation device S2 may be manufactured. Further, the jig used to set the cup 18A thereon is provided with a stopper ST (refer to the two-dotted chain line of FIG. 4) that extends toward the outer peripheral side of the upper surface 20g along the upper surface 20g of the annular contact portion 20A. By using the stopper ST, the positioning operation of the connection wall portion 37 may be performed. Then, the flange portion 33 of the resinous molding portion 31 is pressed to the lower side by the lower surface 20f of the annular contact portion 20A while the male screw 20e is completely fastened to the female screw 37b so that the upper surface 37c of the connection wall portion 37 comes into contact with the stopper ST.

Further, although it is not shown, the actuation device S2 is also accommodated in the casing portion of the inflator. Then, even in the actuation device S2, the resinous molding portion 31 formed in the holder 23A and formed of a synthetic resin includes the flange portion 33 with which the annular contact portion 20A of the cup 18A comes into contact. For this reason, even when a pressing force that presses the annular contact portion 20A toward the holder 23A acts to press the flange portion 33 inward during a connection operation (the caulking operation) using the connector CM (the female screw 37b and the male screw 20e), the flange portion 33 is elastically deformed in a manner similar to the O-ring that is used both now and in the past compared to the metallic holder body 24A or the annular contact portion 20A. That is, even when the flange portion 33 is pressed and deformed by the annular contact portion 20A, the flange portion 33 is restored so as to eliminate a gap between the flange portion 33 and the annular contact portion 20A while maintaining the connected state (the caulked state using the female screw 37b and the male screw 20e) by the connector CM after the holder 23A and the cup 18A are connected to each other. For this reason, a gap may be prevented from being formed between the flange portion 33 and the annular contact portion 20A as much as possible.

Further, even in the actuation device 82, the support portion 26A formed in the metallic holder body 24A is disposed in parallel to the annular contact portion 20A and the flange portion 33 so as to overlap with each other in the axial direction (the vertical direction) of the cup 18A. The support portion 26A is configured to support the flange portion 33 pressed while coming into contact with the annular contact portion 20A. For this reason, when the holder 23A and the cup 18A are connected to each other by the connector CM, a pressing force that presses the annular contact portion 20A may be prevented from pressing the flange portion 33 inward more than the necessary pressing degree. As a result, even in the actuation device S2, the connection workability of the connector CM (the fastening workability of the female screw 37b and the male screw 20e) is also satisfactory. That is, even in the actuation device S2 having the above-described configuration, the flange portion 33 formed in the resinous molding portion 31 of the holder 23A serves as the O-ring, so that it is difficult for a gap to form between the flange portion 33 and the annular contact portion 20A of the cup 18A. Further, it is difficult for a gap to form between the flange portion 33 and the support portion 26A of the holder 23A. For this reason, it is difficult for a gap to form between the cup 18A and the holder 23A, so that the air-tightness of the housing 17A may be satisfactorily maintained. As a result, it is difficult for humidity to enter the cup 18A, so that the satisfactory combustion state of the gas generating agent 15 may be ensured for a long period of time when the squib 13 is actuated.

Further, even in the actuation device S2 having the above-described configuration, the resinous molding portion 31 forming the flange portion 33 is integrally molded with the squib 13 together with the holder body 24A. For this reason, the actuation device may be manufactured at low cost with a simple configuration compared to the case where the O-ring is used as in the related art. Further, even in the actuation device S2 having the above-described configuration, the holder body 24A and the squib 13 are integrally formed with each other through the resinous molding portion 31 when the resinous molding portion 31 is molded. For this reason, satisfactory sealing performance is obtained between the squib 13 and the holder body 24A.

Accordingly, even in the actuation device S2 having the above-described configuration, the air-tightness of the housing 17A may be satisfactorily maintained with a simple configuration, and the actuation device may be manufactured at low cost.

Further, the connection between the annular contact portion 20A and the connection wall portion 37 is not limited to the screw connection. For example, a configuration of connecting the annular contact portion and the connection wall portion to each other may be adopted in which the outer diameter of the annular contact portion is set to be equal to or slightly smaller than the inner diameter of the connection wall portion, and the annular contact portion is pressed into the connection wall portion until the lower surface (the front end surface) comes into contact with the flange portion so that the flange portion is pressed. At this time, the ignition portion holder of the resinous molding portion disposed at the inner peripheral side of the annular contact portion (the inner peripheral side of the peripheral wall portion in the cup) supports the annular contact portion.

Further, in the embodiment, the actuation devices S1 and S2 of the inflator 1 are exemplified as the gas generating device. However, the gas generating device of the invention may be used also as a micro gas generator or an actuation device of a pyro type inflator. Then, in the actuation devices (the gas generating devices) S1 and S2, as described above, the air-tightness of the housings 17 and 17A may be satisfactorily maintained. For this reason, it is difficult for humidity to enter the cups 18 and 18A, so that the satisfactory combustion state of the gas generating agent 15 may be ensured for a long period of time when the squib 13 is actuated. As a result, the actuation devices (the gas generating devices) S1 and S2 of the embodiment may be appropriately used as the micro gas generator.

Further, in the actuation devices S1 and S2 of the embodiment, the cups 18 and 18A serving as the housing body are filled with the gas generating agent 15, and the annular contact portions 20 and 20A are respectively disposed at the peripheral edges of the openings 18a of the cups 18 and 18A. Then, the actuation devices S1 and S2 of the embodiment are accommodated in the casing portion 9 of the inflator 1 while the cups 18 and 18A are respectively connected to the holders 23 and 23A by the connector CM formed in the vicinity of the annular contact portions 20 and 20A. For this reason, the actuation devices S1 and S2 may be manufactured in different places, and be assembled in the inflator 1. That is, the actuation devices S1 and S2 having the gas generating agent 15 or the squib 13 and the inflator 1 may be manufactured at different places. For this reason, the gas generating agent, the squib, or the like may be satisfactorily handled, which is desirable in the invention. Then, if this point is not taken into consideration, the actuation device S3 serving as the gas generating device may have the configuration shown in FIG. 5.

Figure 5:
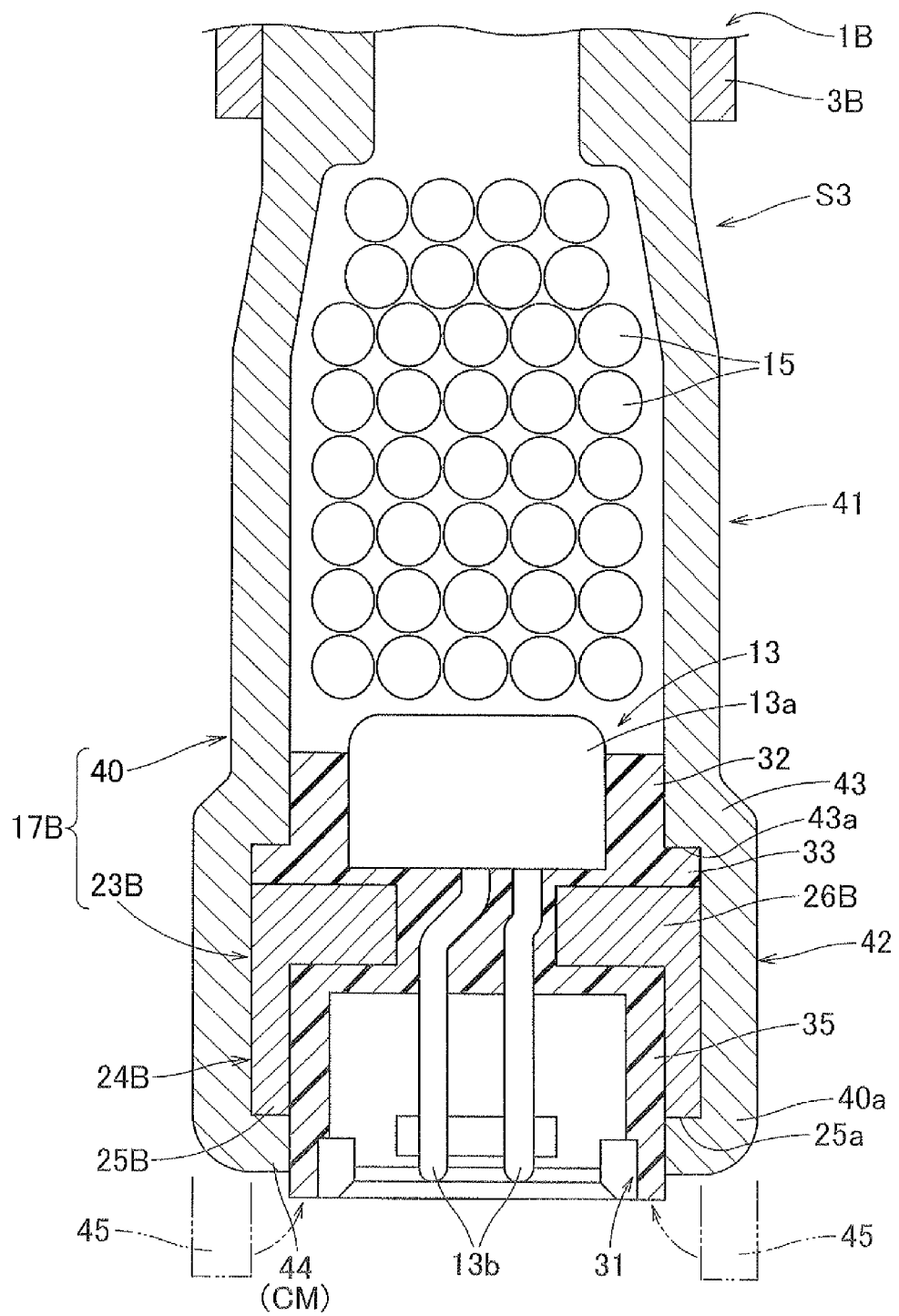
FIG. 5 is a schematic longitudinal sectional view illustrating an actuation device according to still another embodiment of the invention.

The actuation device S3 shown in FIG. 5 has the same configuration as that of the actuation device S1 except for a housing 17B. in the actuation device S3, the detailed description thereof will not be repeated by giving the same reference numeral to the same component as that of the actuation device S1. Specifically, the housing 17B of the actuation device S3 does not include the cup serving as the housing body, and uses a casing portion 40 of an inflator 1B as a housing body. Further, the housing 17B includes the casing portion 40, the holder 23B, and the connector CM connecting the casing portion 40 and the holder 23B to each other. The holder 23B includes the holder body 24B and the resinous molding portion 31 having the same configuration as that of the actuation device S1. The holder body 24B has the same configuration as that of the holder body 24 of the actuation device S1 except that the caulking portion is not provided. For this reason, the detailed description of the holder body 24B will not be repeated by giving "B" at the end of the reference numeral of the same component as that of the holder body 24 of the actuation device S1.

The casing portion 40 forming the housing body is formed so as to extend from the gas filling portion 3B forming the outer peripheral wall of the inflator 1B. Further, the casing portion 40 is formed in a substantially cylindrical shape in which the outer peripheral side of the holder 23B is covered. The casing portion 40 includes an upper gas generating agent accommodation portion 41, and a lower holder accommodation portion 42 that has a diameter larger than that of the gas generating agent accommodation portion 41. An annular contact portion 43 is deposed at the boundary portion between the gas generating agent accommodation portion 41 and the holder accommodation portion 42 in the casing portion 40. The annular contact portion 43 is substantially formed along the direction perpendicular to the axis of the casing portion 40, and is enlarged at the holder accommodation portion 42. The annular contact portion 43 is formed so that a lower surface 43a coming into contact with the flange portion 33 is aligned with the transverse direction (refer to FIG. 5). Further, a caulking portion 44 (the connector CM) is caulked at a leading end (a lower end 40a) distant from the gas generating agent 15 in the casing portion 40 so as to cover an end surface (a lower end surface 25a of an outer cylinder portion 25B) distant from the gas generating agent 15 in the holder body 24B, whereby the casing portion 40 and the holder 23B are connected to each other. The caulking portion 44 is a portion formed by pulling down the caulking target portion 45 (refer to the two-dotted chain line of FIG. 5) extending from the casing portion 40 (the lower end of the holder accommodation portion 42) toward the central axis of the casing portion 40 that and pressing the caulking target portion 45 to the upper side (on the side of the holder body 24B) in the axial direction (the vertical direction) of the casing portion 40. In the embodiment, the caulking portion 44 is formed to cover the entire periphery of the lower end surface 25a of the outer cylinder portion 25B in the holder body 24B. Further, the flange portion 33 of the resinous molding portion 31 in the holder 23B comes into contact with the lower surface 43a of the annular contact portion 43 of the casing portion 40 when the caulking portion 44 is formed. Then, the caulking portion 44 is disposed in parallel to the annular contact portion 43 and the flange portion 33 so as to overlap with each other in the axial direction (the vertical direction) of the casing portion 40.

The actuation device S3 having the above-described configuration may be manufactured as below. First, the gas generating agent 15 is filled into the gas generating agent accommodation portion 41 of the casing portion 40, extending from the gas filling portion 3B filled with pressurization gas in the inflator 1B, from the lower end side opening. Subsequently, the holder 23B is accommodated in the holder accommodation portion 42 from the lower end side opening. Then, the caulking portion 44 serving as the connector CM is formed by pressing and caulking the caulking target portion 45 protruding to the lower side farther than the holder 23B to the upper side (the side of the holder 23B) in the axial direction of the casing portion 40. In this manner, when the holder 23B and the casing portion 40 are connected to each other, the actuation device S3 may be manufactured to be integrated with the inflator 1B.

Then, even in the actuation device S3 (the gas generating device) used in the inflator 1B, the annular contact portion 43 formed in the casing portion 40 serving as the housing body is pressed toward the holder 23B (to the lower side) in the axial direction (the vertical direction) of the casing portion 40 when the caulking portion 44 is caulked so as to cover the lower surface side of the casing portion 40. Then, in the actuation device S3, the resinous molding portion 31 formed in the holder 23B and formed of a synthetic resin includes the flange portion 33 with which the annular contact portion 43 of the casing portion 40 comes into contact. For this reason, even when a pressing force that presses the annular contact portion 43 toward the holder 23B acts to press the flange portion 33 inward during a connection operation (the caulking operation of the caulking portion 44) using the connector CM, the flange portion 33 is elastically deformed in a manner similar to the O-ring that is used both now and in the past compared to the metallic holder body 24B or the annular contact portion 43. That is, even when the flange portion 33 is pressed and deformed by the annular contact portion 43, the flange portion 33 is restored so as to eliminate a gap between the flange portion 33 and the annular contact portion 43 while maintaining the connected state using the connector CM after the holder 23B and the casing portion 40 are connected to each other. For this reason, a gap between the flange portion 33 and the annular contact portion 43 may be prevented as much as possible. Further, even in the actuation device S3 having the above-described configuration, the support portion 26B formed in the metallic holder body 24B is disposed in parallel to the annular contact portion 43 and the flange portion 33 so as to overlap with each other in the axial direction of the casing portion 40. The support portion 26B is configured to support the flange portion 33 pressed while coming into contact with the annular contact portion 43. For this reason, when the holder 23B and the casing portion 40 are connected to each other by the connector CM, a pressing force that presses the annular contact portion 43 may be prevented from pressing the flange portion 33 inward more than the necessary pressing degree. As a result, the connection workability of the connector CM is also satisfactory. That is, even in the actuation device S3 having the above-described configuration, the flange portion 33 formed in the resinous molding portion 31 of the holder 23B serves as the O-ring, so that it is difficult for a gap to form between the resinous molding portion and the annular contact portion 43 of the casing portion 40. Further, it is difficult for a gap to form between the holder 23B and the support portion 26B. For this reason, it is difficult for a gap to form between the casing portion 40 and the holder 23B, so that the air-tightness of the housing 17B may be satisfactorily maintained.

Further, even in the actuation device S3 having the above-described configuration, the resinous molding portion 31 forming the flange portion 33 is integrally molded with the squib 13 together with the holder body 24B. For this reason, the actuation device may be manufactured at low cost with a simple configuration compared to the case where the O-ring is used as in the related art. Further, even in the actuation device S3 having the above-described configuration, the holder body 24B and the squib 13 are integrally formed with each other through the resinous molding portion 31 when the resinous molding portion 31 is molded. For this reason, satisfactory sealing performance is obtained between the squib 13 and the holder body 24B.

Accordingly, even in the actuation device S3 of the inflator 1B having the above-described configuration, the air-tightness of the housing 17B may be satisfactorily maintained with a simple configuration, and the actuation device may be manufactured at low cost.

Further, even in the actuation device S3 having the above-described configuration, as the connector CM connecting the holder 23B and the casing portion 40 (the housing body) to each other, the caulking portion 44 is used which is formed at the leading end (the lower end 40a) distant from the gas generating agent 15 in the casing portion 40 so as to cover the end surface (the lower end surface 25a of the outer cylinder portion 25B) distant from the gas generating agent 15 in the holder body 24B. For this reason, the actuation device S3 may be manufactured at low cost without the need of high precision in dimension.

Further, in the actuation devices S1, S2, and S3 of the embodiments, each thickness of the support portions 26, 26A, and 26B in the axial direction (the vertical direction) of the housing body (the cups 18 and 18A, and the casing portion 40) is set to be larger than the thickness of the flange portion 33 in the vertical direction. For this reason, the flange portion 33 may be reliably supported by the support portions 26, 26A, and 26B. Of course, if this point is not taken into consideration, the thickness of the support portion may be substantially equal to or smaller than the thickness of the flange portion.

What is claimed is:
1. A gas generating device comprising:
a housing which is filled with a gas generating agent generating a gas during combustion; and
a squib which is accommodated in the housing to ignite the gas generating agent,
wherein the housing includes a metallic housing body which forms an accommodation portion accommodating the gas generating agent, a holder which includes a metallic holder body and a resinous molding portion, the resinous molding portion holds the squib and is formed of a synthetic resin and is interposed between the holder body and the squib, and the holder body has a caulking portion which connects the housing body and the holder to each other,
wherein the housing body is formed in a substantially cylindrical shape and includes an annular contact portion coming into contact with an end surface of the holder that faces toward the gas generating agent, the housing body being connected to the holder by the caulking portion while the annular contact portion is pressed toward the holder in the axial direction of the housing body,
wherein the squib is integrally molded with the holder to be supported by the holder when the resinous molding portion is molded,
wherein the resinous molding portion includes a flange portion which comes into contact with the entire periphery of a surface of the annular contact portion on the side of the holder,
wherein the holder body includes a support portion capable of supporting the flange portion pressed while coming into contact with the annular contact portion when the housing body and the holder are connected to each other by the caulking connector,
wherein the annular contact portion, the flange portion, and the support portion are disposed in parallel so as to overlap with each other in the axial direction of the housing body; and while the flange of the resinous molding portion is arranged between the annular contact portion and support portion of the holder body, the caulking portion presses against the annular contact portion of the housing body and toward the support portion of the holder body in the axial direction of the housing body and creates air-tightness between the housing body and the holder;
wherein the caulking portion extends from the support portion of the holder body, overlaps the annular contact portion in the axial direction of the housing body and substantially covers an entire periphery of an upper surface side of an outer peripheral edge of the annular contact portion, and
wherein the support portion has a plate shape with thickness along the axial direction of the housing body, and the thickness of the support portion is larger than a thickness of the flange portion in the axial direction of the housing body.

2. The gas generating device according to claim 1,
wherein the housing body is formed in a cup shape with a bottom, and the annular contact portion is disposed at the peripheral edge of an opening so as to protrude in a flange shape, and
wherein the caulking portion is formed around the annular contact portion.

3. The gas generating device according to claim 2, wherein the gas generating device is used as an actuation device of an inflator.

4. A gas generating device, which comprises a housing filled with a gas generating agent and a squib arranged in the housing to ignite the gas generating agent;
the housing including a housing body holding the gas generating agent, a holder integrally formed with and supporting the squib, and a pressing connector connecting the housing body and the holder while maintaining air-tightness therebetween;
the housing body having a substantially cylindrical shape and an annular contact portion having a bottom surface extending radially from and perpendicularly to the cylindrical shape;
the holder including a metallic holder body and a resinous molding portion, the resinous molding portion being interposed between the squib and the holder body and holding the squib, the holder body including a support portion extending radially into the resinous molding portion, the resinous molding portion including a flange portion interposed between the annular contact portion of the housing body and the support portion of the holder, the flange having parallel upper and bottom surfaces, the upper surface of the flange contacting the bottom surface of the annular contact portion;
the support portion of the holder body having a supporting surface contacting a lower surface of the flange portion of the resinous molding portion, the supporting surface of the support portion supporting the flange when the flange portion is pressed toward the support portion; and the upper and the bottom surfaces of the flange portion, the support surface of the support portion and the bottom surface of the annular contact portion being parallel to and overlapping each other in the axial direction of the housing body, wherein the pressing connector presses the annular contact portion against the flange portion and toward the supporting surface of the support portion in the axial direction of the housing body, elastically deforming the flange portion and creating air-tightness between the housing body and the holder.

5. The gas generating device according to claim 4,
wherein the support portion has a plate shape with a thickness along the axial direction of the housing body, and the thickness of the support. portion is larger than a thickness of the flange portion in the axial direction of the housing body.

6. The gas generating device according to claim 5,
wherein the annular contact portion has an outer peripheral surface, and the pressing connector comprises a caulking portion arranged within the holder body, the caulking portion extending from the support portion of the holder body, overlapping the outer peripheral surface of the annular contact portion and substantially covering the upper surface of the annular contact portion.

7. The gas generating device according to claim 5,
wherein the housing body has a cup shape, the annular contact portion is disposed at an opening of the cup and protrudes in a flange shape, and wherein the pressing connector is formed around the annular contact portion.

8. The gas generating device according to claim 7, wherein the gas generating device is used as an actuation device of an inflator.

9. The gas generating device according to claim 7, wherein the pressing connector includes a male screw which is formed in the outer peripheral surface of the annular contact portion and a female screw which is formed in the housing body so as to be threaded into the male screw.

10. The gas generating device according to claim 4,
wherein the housing body has a cup shape, the annular contact portion is disposed at an opening of the cup and protrudes in a flange shape, and wherein the pressing connector is formed around the annular contact portion.

11. The gas generating device according to claim 10, wherein the gas generating device is used as an actuation device of an inflator.

12. The gas generating device according to claim 4,
wherein the gas generating device is used as an actuation device of an inflator, wherein the substantially cylindrical shape of the housing body extends from the outer peripheral wall of the inflator and covers the outer peripheral side of the holder, and wherein the housing body includes a caulking portion which serves as the pressing connector and is provided by pressing and caulking a leading end side of the housing body distant from the gas generating agent to the end surface of the holder body distant from the gas generating agent in the axial direction of the housing body.

* * * * *